(12) United States Patent
Stratulat et al.

(10) Patent No.: US 9,383,049 B2
(45) Date of Patent: Jul. 5, 2016

(54) UNIVERSAL COUPLING AND PARTS THEREFOR

(75) Inventors: Valer Stratulat, Kitchener (CA); Donald William Stark, London (CA)

(73) Assignee: Cambridge Brass, Inc., Cambridge, Ontario (CA)

( * ) Notice: Subject to any disclaimer, the term of this patent is extended or adjusted under 35 U.S.C. 154(b) by 0 days.

(21) Appl. No.: 13/098,876

(22) Filed: May 2, 2011

(65) Prior Publication Data

US 2012/0280486 A1 Nov. 8, 2012

(51) Int. Cl.
*F16L 33/00* (2006.01)
*F16L 19/08* (2006.01)
*F16L 19/075* (2006.01)

(52) U.S. Cl.
CPC .............. *F16L 19/086* (2013.01); *F16L 19/075* (2013.01)

(58) Field of Classification Search
USPC ......... 285/322–324, 243, 245, 247–249, 383, 285/341, 343, 104, 105
See application file for complete search history.

(56) References Cited

U.S. PATENT DOCUMENTS

| | | | | |
|---|---|---|---|---|
| 987,296 | A * | 3/1911 | Hahn | 277/520 |
| 1,714,590 | A * | 5/1929 | Dake | 285/341 |
| 4,822,082 | A | 4/1989 | Phillipps | |
| 5,135,266 | A * | 8/1992 | Bridges et al. | 285/123.7 |
| 5,360,218 | A * | 11/1994 | Percebois | F16L 37/0845 285/104 |
| 5,593,186 | A | 1/1997 | Harris | |
| 6,257,628 | B1 * | 7/2001 | Nijsen | 285/323 |
| 6,371,531 | B1 * | 4/2002 | Robison | 285/342 |
| 6,402,206 | B1 | 6/2002 | Simmons et al. | |
| 7,255,373 | B2 | 8/2007 | Pridham | |
| 7,699,357 | B2 * | 4/2010 | Monsen et al. | 285/322 |
| 7,726,700 | B2 | 6/2010 | Norman | |
| 2003/0071461 | A1 | 4/2003 | Roberts et al. | |
| 2007/0164563 | A1 | 7/2007 | Arstein et al. | |
| 2011/0181042 | A1 | 7/2011 | Clason et al. | |

FOREIGN PATENT DOCUMENTS

CA 2 623 218 4/2007
EP 1 800 047 B1 12/2009
(Continued)

OTHER PUBLICATIONS

"Metric/Imperial Universal Transition Coupling Technical Manual"; Published May 2008; Philmac, East Sussex, ENGLAND; [online]; Retrieved from the Internet at http://www.philmac.co.uk/products/universal-transitión-couplings/ <URL: http://www.philmac.co.uk/wp-content/uploads/Utc_3G_tech_manual_METRIC-IMPE-RIAL_email_version.pdf>.

(Continued)

*Primary Examiner* — Aaron Dunwoody
(74) *Attorney, Agent, or Firm* — Alston & Bird LLP

(57) ABSTRACT

A gripping device may be used to grip an inserted member. The gripping device has a body. The body defines a passage extending therethrough between opposite longitudinal ends. The body has an outer surface and an inner surface. The body includes at least three gripping elements spaced apart around the inner surface. Each of the gripping elements has a gripping surface for gripping an outer surface of the inserted member. Each of the gripping elements is movable upon application of a radial inward force to the outer surface of the body to reduce the spacing between adjacent gripping elements.

26 Claims, 18 Drawing Sheets

(56) References Cited

FOREIGN PATENT DOCUMENTS

| JP | 09060771 A | 3/1997 |
|----|----|----|
| WO | WO 03/010461 A1 | 2/2003 |
| WO | WO 2006/041285 A2 | 4/2006 |

OTHER PUBLICATIONS

"PremiumPlast Accessorios PP • PP Fittings • Raccords PP"; STP Holdings; Barcelona, SPAIN; [online]; Retrieved from the Internet at www.stp-sa.com on Jul. 29, 2011; <URL: http://www.stp-sa.com/images/stories/catalogs/premium.pdf>.

"Talbot Grippa Service Fitting for Water Pipe", 2007; Talbot, London, UK; [online]; Retrieved from the Internet at http://www.tycowaterworks.com/products-pushfit.html; <URL: http://www.tycowaterworks.com/pdf/PLASTIC%20PUSHFIT%20FITTINGS/Talbot%20Grippa%20Data%20Sheet.pdf>.

"Talbot Pushfit Service and Mains fitting for Water Pipe", 2007; Talbot, London, UK; [online]; Retrieved from the Internet at http://www.tycowaterworks.com/products-pushfit.html; <URL http://www.tycowaterworks.com/pdf/PLASTIC%20PUSHFIT%20FITTINGS/Talbot%20Pushfit%20Fittings%20Data%20Sheet.pdf>.

International Search Report and Written Opinion from PCT/CA2011/050746, mailed Jan. 26, 2012.

\* cited by examiner

UNIVERSAL COUPLING AND PARTS THEREFOR

FIELD OF THE INVENTION

This application relates to a coupling for use in the connection of members such as pipes, conduits, cylindrical members and control mechanisms. In particular, this application relates to a coupling usable for the connection of pipes, conduits, cylindrical members and control mechanisms of differing diameters and/or differing materials.

BACKGROUND

Pipes are used to transport fluids in many situations. For example, pipes or other conduits are used in distribution systems for potable water, in gas or oil transportation systems, and in delivery systems for other fluids. The pipes in such systems are manufactured in a variety of lengths and diameters. At various locations in such systems, it is necessary to join the end of a pipe to another pipe or another component of the system. Other components of the system may include control mechanisms such as a valve, a valve assembly, or a meter setter. A meter setter may be used in a potable water distribution system to hold a water meter in a distribution line. There are various ways of making the required connection. One way of making the connection is to use a coupling.

A coupling can be a separate component or it may be integrated into another component of the system or a pipe end to allow the direct connection between the pipe end or other component and a separate pipe. The required characteristics of the coupling will depend on the environment in which it will be used and the fluid it will carry. In some cases, it is important that the coupling provide a fluid tight seal so that no fluid can leak out of the coupling. The coupling may also be required to provide restraint to prevent separation of the joint due to pressure or tension. In certain applications, it may also be necessary to provide electrical conductivity between the pipes, conduits or control mechanisms being joined.

In many systems, a variety of pipe diameters may be used. In order to make connections between pipes of differing diameters and/or materials, it is advantageous to have a coupling that can accommodate a wide range of pipe diameters and/or materials while still being able to provide a reliable and leak proof seal. Couplings that are adjustable to be used to join pipes of differing diameters, however, may be effective only over a narrow range of pipe diameters.

SUMMARY OF THE INVENTION

According to an aspect of the invention, there is provided a gripping device for use in gripping an inserted member, comprising: a body defining a passage extending therethrough between opposite longitudinal ends, the body having an outer surface and an inner surface, and gripping elements spaced apart around the inner surface, each gripping element having a gripping surface for gripping an outer surface of the inserted member; wherein each of the gripping elements are movable upon application of a radial inward force to the outer surface of the body wherein a spacing between adjacent gripping elements is reduced.

In some embodiments, the inserted member is one of a conduit, a pipe, a cylindrical member and a control mechanism.

In some embodiments, the body has a continuous circumference.

In some embodiments, the continuous circumference comprises a zigzag shape.

In some embodiments, the gripping elements are alternatively positioned adjacent the opposite longitudinal ends.

In some embodiments, the body comprises a plurality of openings between the gripping elements and the spacing between the gripping elements can be reduced upon deformation of the openings.

In some embodiments, the openings extend longitudinally from at least one of the longitudinal ends.

In some embodiments, the openings extend alternatively from the longitudinal ends.

In some embodiments, the openings are V-shaped and adapted to decrease the spacing between the sides of the openings upon application of the radial inward force.

In some embodiments, there is at least one opening between each of the gripping elements.

In some embodiments, the body comprises a first component and the gripping elements comprise second components wherein the body defines recesses for receiving and retaining the gripping elements.

In some embodiments, the gripping elements are supported against longitudinal movement.

In some embodiments, the outer surface of the body comprises at least one angled outer surface and the gripping elements are adapted to move inward, into the passage, upon application of the radial force to the angled outer surface.

In some embodiments, the gripping elements comprise tooth elements which are moveable by compression of the body.

In some embodiments, the longitudinal ends comprise ends surfaces which are substantially continuous when the openings are substantially closed.

In some embodiments, the gripping elements are slidable relative to the body.

In some embodiments, the gripping elements comprise a slidable block element and a tooth element retained in the block element.

In some embodiments, at least one of the longitudinal ends of the body defines protrusions and/or recesses for mating with corresponding protrusions and/or recesses in a seal.

In some embodiments, the device further comprises at least one seal.

According to an aspect of the invention, there is provided a coupling comprising: a coupling body having longitudinal ends, a passage defined through the body between longitudinal ends, and a longitudinal adjustment mechanism at a first of the longitudinal ends; a movable member having a co-operable longitudinal adjustment mechanism; at least one of the coupling body and the movable member having an angled inner surface angling inwardly away from the other of the coupling body and the movable member; a gripping member comprising: a gripping member body defining a passage extending through the gripping member, the gripping member body having an outer surface and an inner surface and longitudinal ends, at least a portion of the outer surface of the gripping member being an angled outer surface to co-operate with the angled inner surface of the coupling body or the movable member; and gripping elements spaced apart around the inner surface, each gripping element having a gripping surface for gripping an outer surface of an inserted member; wherein the gripping member is sized to fit within a space defined by the coupling body and the movable member; and wherein, upon tightening of the moveable member, the angled inner surface abuts against and exerts a force on the angled outer surface of the gripping member in a radial inward direction to cause the gripping member to be urged radially against the inserted member when the inserted member is inserted into the coupling, wherein the gripping member restricts movement of the inserted member.

In some embodiments, both the movable member and the body comprise an angled inner surface, and wherein the outer surface of the gripping member comprises two angled surfaces complimentary to the angled inner surfaces of the movable member and the coupling body, wherein upon tightening, the angled inner surfaces abut against and exert a symmetrical force on the angled outer surfaces of the gripping member in a radial direction to be symmetrically urged radially against the inserted member.

In some embodiments, the coupling further comprises at least one annular seal sized to fit within the space, the at least one annular seal comprising longitudinally extending protrusions and/or recesses, wherein at least one of the longitudinal ends of the gripping member body comprise longitudinally extending protrusions and/or recesses shaped to mate with the protrusions and/or recesses of the at least one annular seal wherein the at least one annular seal is movable with the coupling body to create a seal against the inserted member upon tightening.

In some embodiments, the coupling body comprises external threads at a first of the longitudinal ends and the movable member comprises a nut having internal threads co-operable with the coupling body external threads wherein the movable member is movable longitudinally screwing the threads.

In some embodiments, the coupling body, the movable member and the gripping elements comprise a conductive material and provide a conductive pathway from the inserted member to the coupling body.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying figures, in which.

DETAILED DESCRIPTION OF THE PREFERRED EMBODIMENTS

Figure 1A:
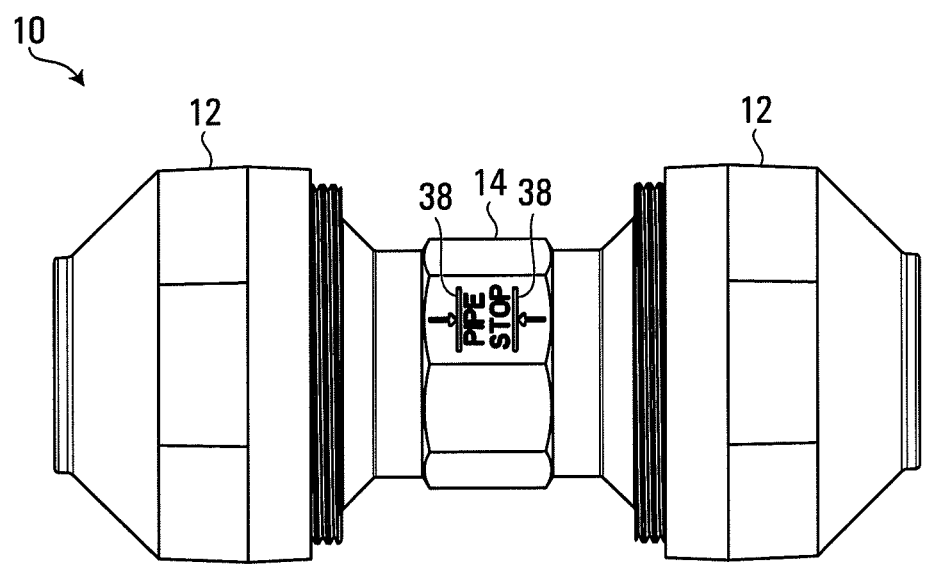
FIG. 1A is a side view of double ended coupling according to an embodiment of the invention.
Figure 1B:
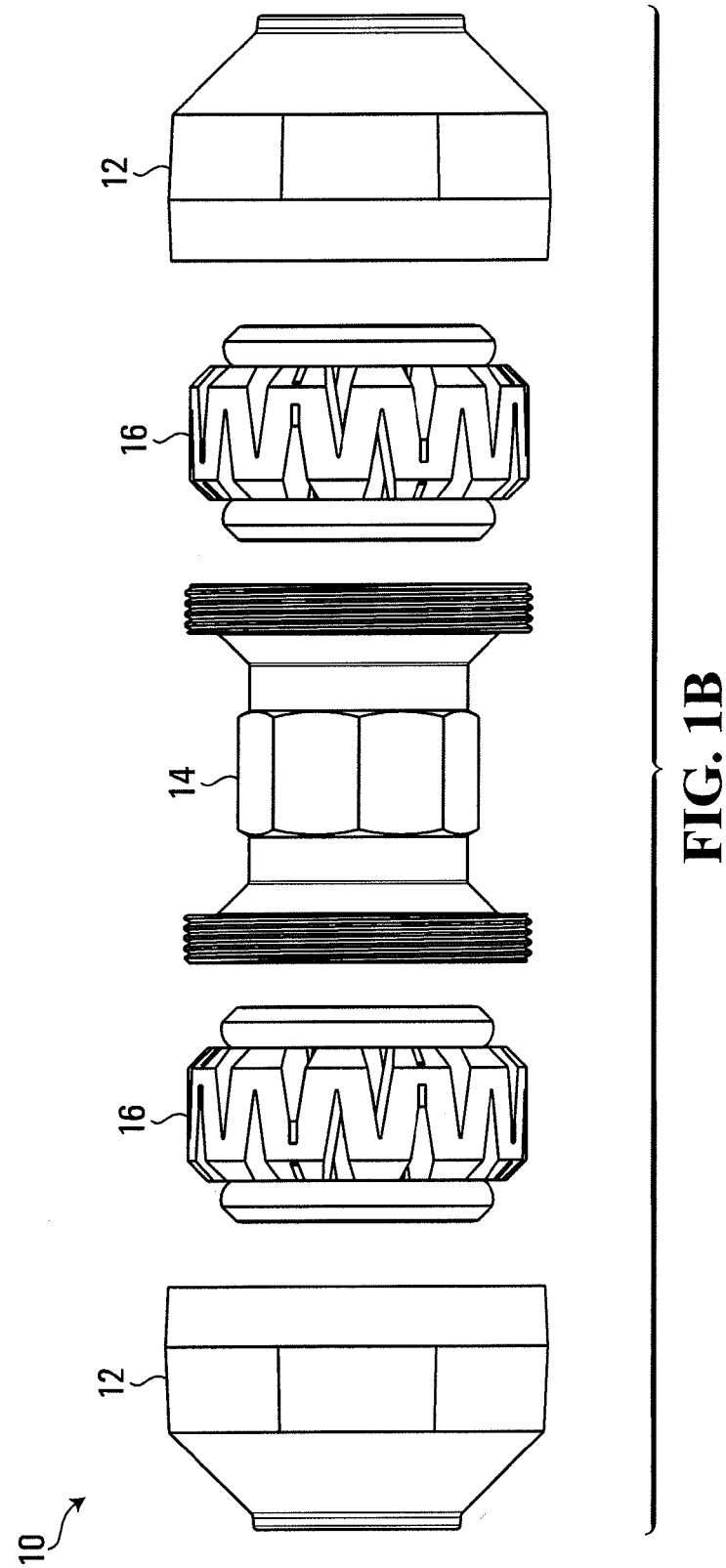
FIG. 1B is an exploded side view of the double ended coupling of FIG. 1A.

FIGS. 1A and 1B depict a coupling 10 according to a first embodiment of the invention. FIG. 1B is an exploded view of the coupling 10 in which the coupling 10 is partially broken down into its component parts. In this embodiment the coupling 10 is a double ended coupling. This means that the coupling 10 can receive and connect two pipe ends. It will be appreciated that the coupling may be single ended and may have a member inserted into only one end.

With reference to FIG. 1B, the coupling 10 has a coupling body 14, two nuts 12 and two gripping assemblies 16. When the coupling 10 is assembled, as shown in FIG. 1A, the gripping assemblies 16 fit within the coupling 10 such that the gripping assemblies 16, shown in FIG. 1B, are not visible. Each of the coupling body 14, the nuts 12 and the gripping assemblies 16 are described in turn below.

Figure 2A:
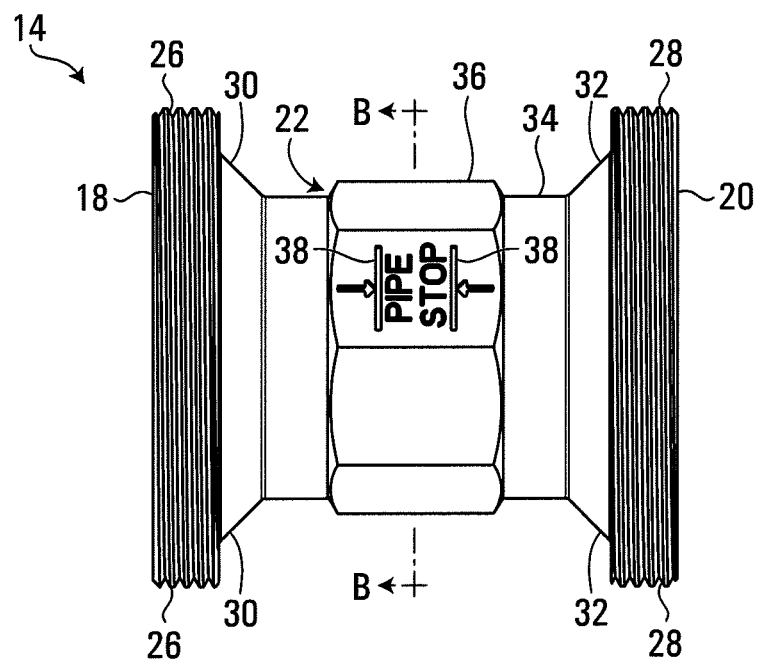
FIG. 2A is a side view of a coupling body of the coupling of FIG. 1A.
Figure 2B:
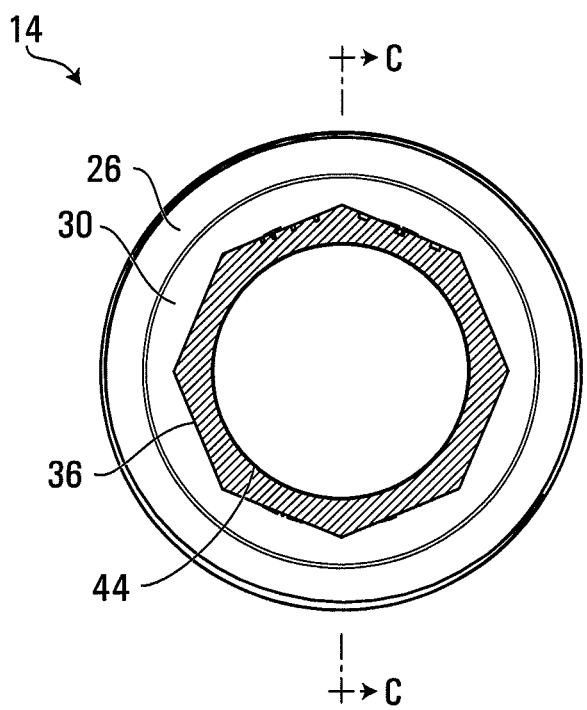
FIG. 2B is a cross-sectional view of the coupling body of FIG. 2A taken along line B-B of FIG. 2A.
Figure 2C:
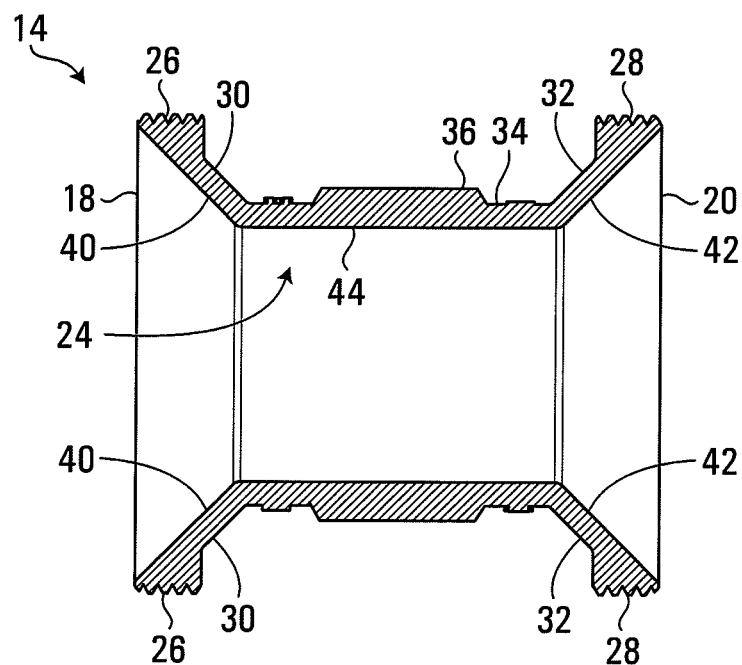
FIG. 2C is a cross-sectional view of the coupling body of FIG. 2A taken along line C-C of FIG. 2B.

The coupling body 14 will be described with reference to FIGS. 2A, 2B and 2C. FIG. 2A is a side view of the coupling body 14 and FIGS. 2B and 2C are cross-sectional views of the coupling body 14. The coupling body 14 has a first end 18 and a second end 20. The coupling body 14 also has an external surface 22 and an internal surface 24. The external surface 22 has a number of sections. The external surface 22 has a threaded portion 26 adjacent the first end and a threaded portion 28 adjacent the second end 20. The threaded portions 26, 28 have external threads extending along their length from the ends 18, 20. The threaded portions 26, 28 have external threads which allow the nut 12 to move longitudinally with respect to the coupling body 14 to provide an adjustable diameter connection. Other longitudinal adjustment mechanisms may be utilized such as a push fit and lock system.

Next along the length of the exterior surface 22 of the coupling body 14 is an angled portion 30 adjacent to the threaded portion 26 and an angled portion 32 adjacent to the threaded portion 28. The angled portions 30, 32 gradually decrease the outer diameter of the coupling body 14. The angled portions 30, 32 are connected by a central section 34 which forms the center of outer surface 22. The central section 34 of the present embodiment includes flats 36 which are a series of 4 pairs of flat surfaces positioned opposite each other across the diameter of the coupling body 14. The flats 36 allow the coupling body to be held by tools such as a wrench. More or fewer flats may be present.

Marked on the central section 34 are two pipe stop markings 38. The pipe stop markings 38 can be used to measure on a pipe or other inserted member the length to be inserted into the coupling 10. The pipe stop markings 38 may be omitted.

Although the exterior surface 22 is shown in this embodiment to have a decreasing diameter from the ends 18, 20 to the central section 34, in other embodiments, the exterior surface may be constant or variable in other ways. The exterior surface may have other shapes to accommodate being held or manipulated by other tools.

The coupling body 14 also includes the internal surface 24. As can be seen in FIG. 2C, the internal surface 24 has a first decreasing diameter section 40 adjacent the first end 18 and a second decreasing diameter section 42 adjacent the second end 20. The first decreasing diameter section 40 and the second decreasing diameter section 42 are joined by a cylindrical section 44. In this embodiment, the decreasing diameter sections 40, 42 decrease in diameter from the ends 18, 20 to the cylindrical section 44. The decreasing diameter sections 40, 42 have a circular cross-section (see FIG. 2B). In the present embodiment, the decreasing diameter sections 40, 42 are funnel shaped and decrease in diameter at an angle of about 45°. In other embodiments, other angles or non-uniform decreasing diameters may be used. In this embodiment, the decreasing diameter sections 40, 42 are aligned lengthwise with the threaded portions 26, 28 and the angled portions 30, 32 on the outside of the coupling body 14.

The cylindrical section 44 has a circular cross-section and, together with the decreasing diameter section 40, 42, defines a longitudinal passage through the coupling body 14 as best seen in FIGS. 2B and 2C. The cylindrical section 44 is aligned with the central section 34.

The positioning of the pipe stop markings 38 is such that pipe ends inserted from either end 18 and 20 will stop within the central section 34, spaced apart from each other.

Figure 3A:
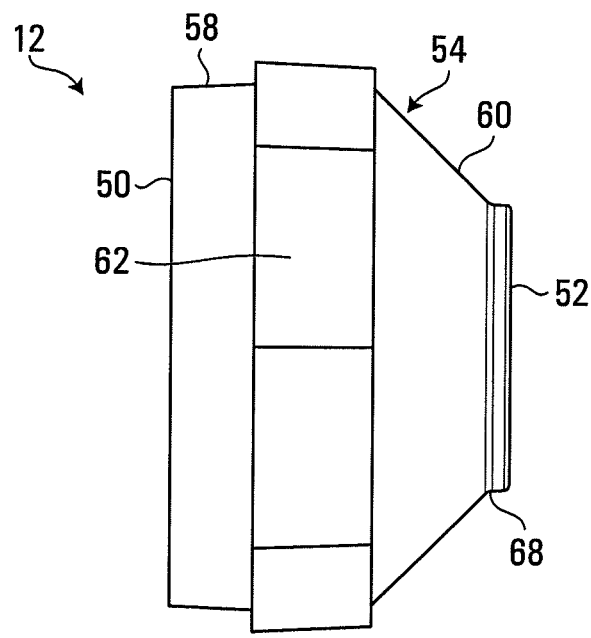
FIG. 3A is a side view of a nut of the coupling of FIG. 1A.
Figure 3B:
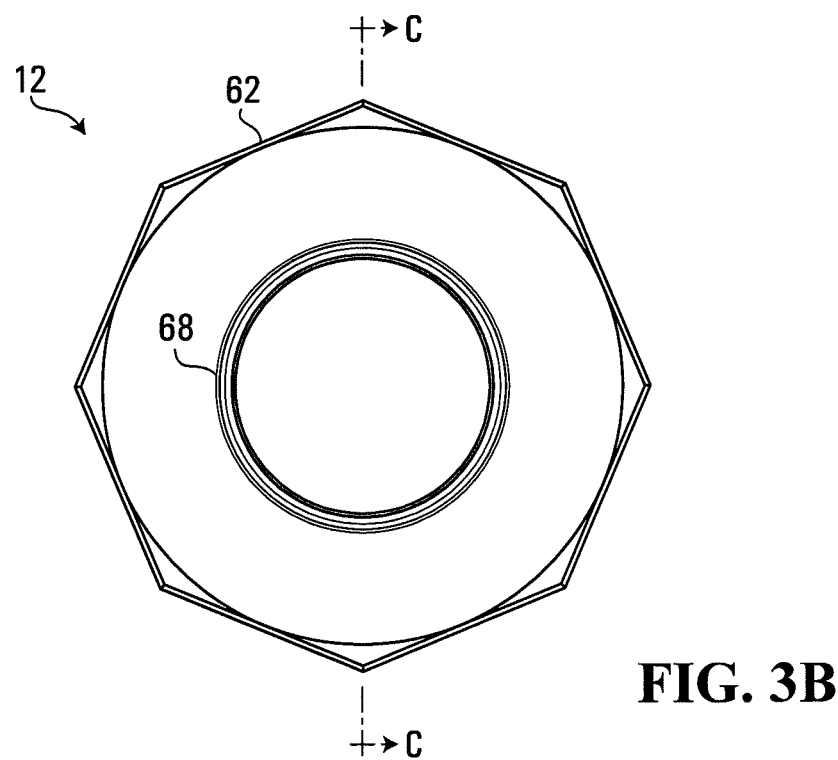
FIG. 3B is an outer end view of the nut of FIG. 3A.
Figure 3C:
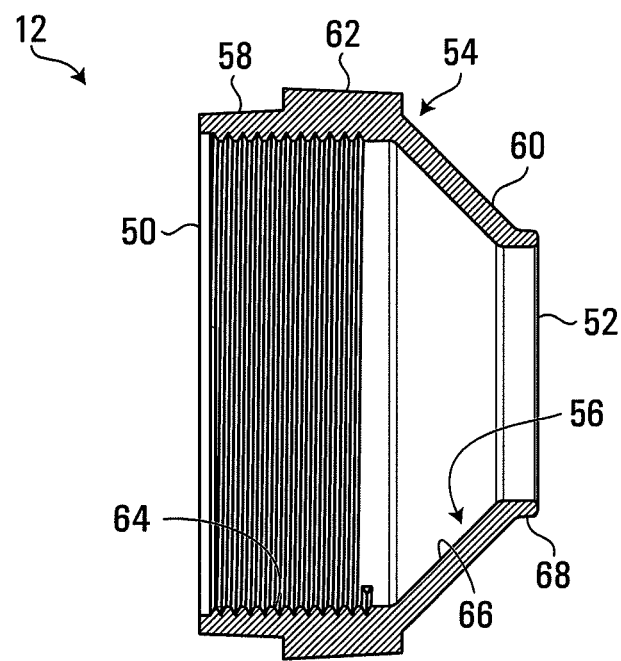
FIG. 3C is a cross-sectional view of the nut of FIG. 3A taken along line C-C of FIG. 3B.

Turning to FIGS. 3A to 3C, these Figures depict three views of the nut 12. The nut 12 has an inner end 50 and an outer end 52. The inner end 50 is the end which mates with the coupling body 14. The outer end 52 is the end which receives the pipe end.

The nut 12 is a movable member which moves longitudinally along the coupling body 14. The nut 12 of this embodiment also has an external surface 54 and an internal surface 56. The external surface 54 is made up of a number of sections. Starting at the inner end 50 of the nut 12, the first section of the external surface 54 is the cylindrical portion 58. The cylindrical portion 58 has a cylindrical outer surface. On the cylindrical portion 58 are the flats 62. The flats 62 of the nut 12, like the flats 36 of the coupling body 14, are a series of four pairs of flat surfaces positioned opposite each other across the diameter of the nut 12. The flats 62 allow the nut 12 to be held by tools such as a wrench. More or fewer flats may be present. It will be appreciated that the flats 36 and 62 are optional and may be eliminated and may be replaced with other shaped surfaces.

The flats 62 are next to an angled portion 60. The angled portion 60 defines a decreasing angle of about 45°. In this embodiment, the decrease in angle is uniform. The angled portion 60 ends at a flange 68. The flange 68 is a short flange extending in the outward direction.

The nut 12 also has an internal surface 56. As can be seen in FIG. 3C, the internal surface 56 of the nut 12 has an internal threaded portion 64. The internal threaded portion 64 is aligned with the cylindrical portion 58 and the flats 62 on the external surface 54. The internal threads on the threaded portion 64 of the nut 12 are sized to mate with the external threads on the threaded portions 26 and 28 of the coupling body 14 such that, in this embodiment, the nut 12 can be screwed further on to and further off of the coupling body 14. Although the nut 12 and the coupling body 14 have co-operating threaded portions 26, 28 and 64, to adjust the diameter of the connection, other adjustable connection means for adjusting the diameter of the connection may be utilized such as a push fit and lock system. Such systems may utilize a movable member that is different from the nut 12.

The nut 12 also includes an internal decreasing diameter section 66 between the threaded portion 64 and the outer end 52. The decreasing diameter section 66, in this embodiment, decreases in diameter from the flats 62 to the flange 68. The decreasing diameter section 66 of the nut 12 has a circular cross-section (see FIG. 3B). The decreasing diameter section 66 is funnel shaped and decreases in diameter at an angle of about 45°. In other embodiments, the angle may vary and may not decrease uniformly. In this embodiment, the decreasing diameter section 66 is aligned lengthwise with the angled portion 60 on the outside of the nut 12. The decreasing diameter section 66 ends at the flange 68 which has a cylindrical internal passage.

The coupling body 14 and the nut 12 of this embodiment have generally the same internal and external shape such that the nut 12 has a substantially uniform thickness, thin walled construction with an internal passage extending therethrough. In other embodiments, the relative internal and external shapes may vary.

Figure 4:
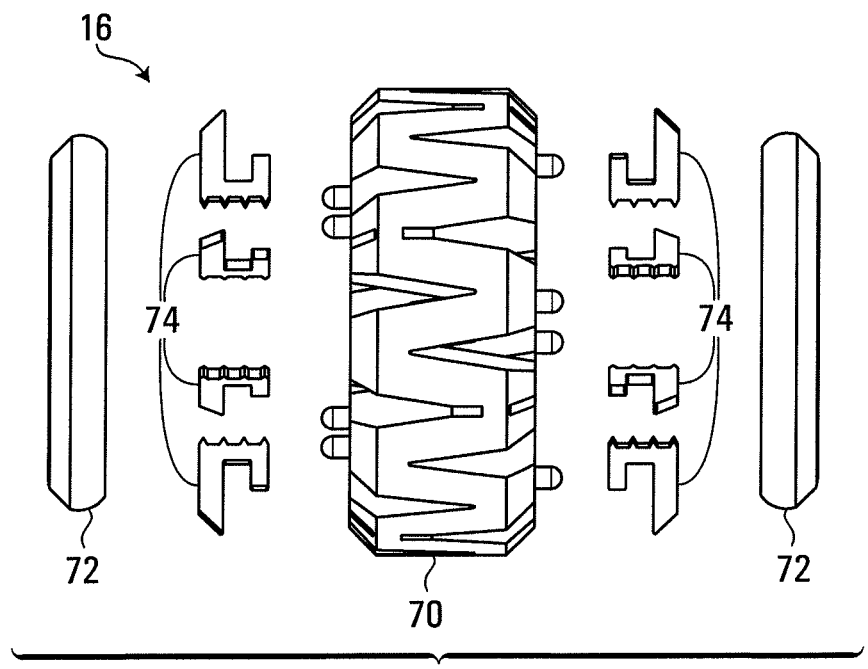
FIG. 4 is an exploded side view of the gripping assembly of the coupling of FIG. 1A.

The gripping assembly 16 is shown in an exploded view in FIG. 4. The gripping assembly includes a gripper body 70, two seals 72 and eight tooth members 74.

The gripper body 70 is shown in further detail in FIGS. 5A to 5F. The gripper body 70 of the present embodiment is based on a cylindrical shape having an outer surface 78 and in inner surface 80. The gripper body 70 also has an end face 82 and an opposite end face 84.

The end face 82 and the opposite end face 84 are perpendicular to the outer surface 78. The end face 82 is joined to the outer surface 78 by an angled section 88. Similarly, the opposite end face 84 is joined to the outer surface 78 by an opposite angled section 90. The angled sections 88 and 90 are at a 45° angle to the outer surface 78, the end face 82 and the opposite end face 84. In other embodiments, other angles may be used or the angled sections 88 and 90 may be eliminated. In this embodiment, the angle of the angled sections 88 and 90 matches the angle of the first and second decreasing diameter sections 40 and 42 of the coupling body 14 and the angle of the internal surface 56 of the nut 12 so that the angled sections 88 and 90 slide along the first and second decreasing diameter sections 40 and 42 and the internal surface 56 during use as will be discussed further below. It will be understood that other complimentary angles or shapes may also be used.

The gripper body 70 in the present embodiment has a generally accordion shape. In particular, a series of V-shaped cut-outs 86 are defined in the gripper body 70 from both the end faces 82 and 84. The cut-outs 86 have their wide end at the end faces 82 and 84 and taper to a point toward the respective opposite end faces 84 and 82. The cut-outs 86 alternate from the end faces 82 and 84 are staggered such that they extend past each other from opposite directions. The cut-outs 86 extend all the way through the thickness of the gripper body 70 from the outer surface 78 to the inner surface 80 such that the outer surface 78 and the inner surface 80 have a zigzag appearance.

In the present embodiment, there are 12 cut-outs 86 from each of the end faces 82 and 84. The result is the end face 82 being subdivided in 12 alternating lands 82A, 82B and 82C (see FIG. 5A) and the opposite end face 84 being subdivided in 12 lands 84A, 84B and 84C. In other embodiments, there may be more or fewer cut-outs 86 resulting in more or fewer lands 82A, 82B, 82C, 84A, 84B and 84C.

The lands 82A of the end face 82 of the present embodiment each have a pin 92. Similarly, the lands 84A of the opposite end face 84 of this embodiment each have a pin 93. The result is a total of four pins on each of the end face 82 and the opposite end face 84 of this embodiment. The pins 92 and 93 of the present embodiment are cylindrical with rounded heads. The pins 92 and 93 extend out from the end face 82 and the opposite end face 84 parallel to the outer surface 78 and the inner surface 80. The pins 92 are spaced equally at four corners of a square around each of the end face 82 and the opposite end face 84. The lands 82A are staggered from the lands 84A such that the location of the pins 92 on the end face 82 are not lined up with the location of the pins 93 on the opposite end face 84. Instead the pins 92 and the pins 93 are spaced between each other (see FIGS. 5D to 5F).

The pins 92 and 93 may aid in locating the seals. The pins 92 and 93, by connecting the seals 72 to the gripper body 70 also create a subassembly which may aid in assembling the coupling 10. However, the pins 92 and 93 may be more or fewer in number, may not be uniformly spaced, may be protrusions of other shapes and may be completely eliminated.

Figure 5A:
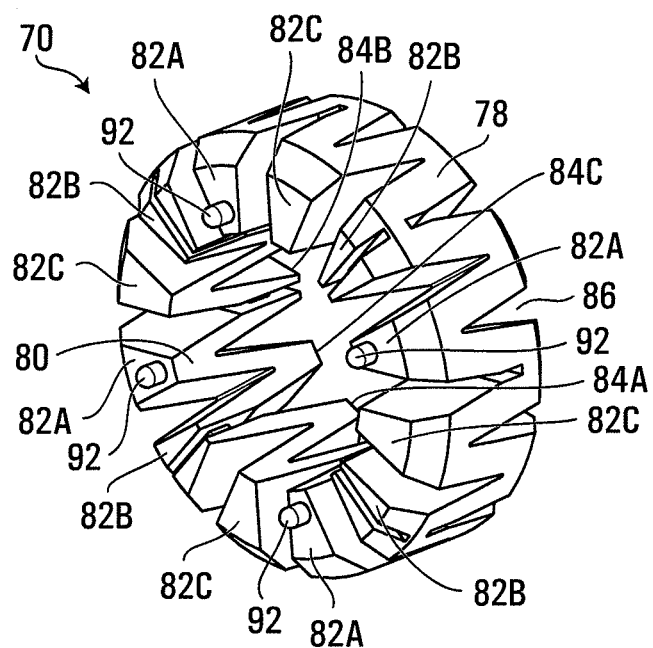
FIG. 5A is a perspective view of a gripper body of the gripping assembly of FIG. 4.
Figure 5B:
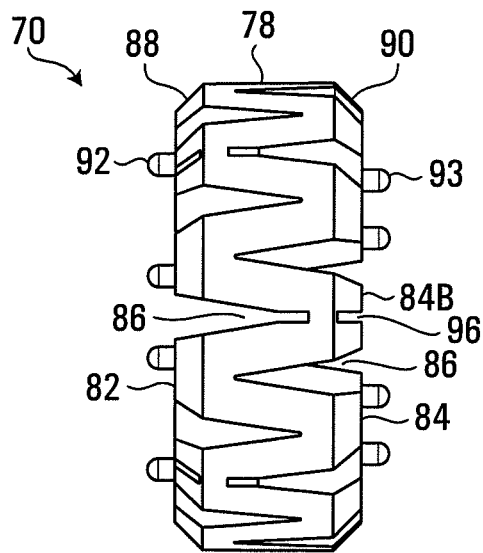
FIG. 5B is a side view of the gripper body of FIG. 5A.
Figure 5C:
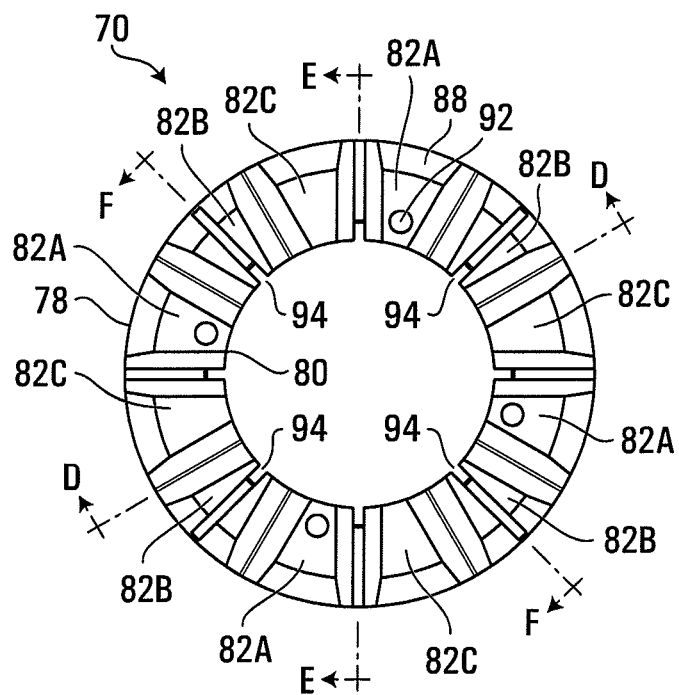
FIG. 5C is an end view of the gripper body of FIG. 5A.
Figure 5D:
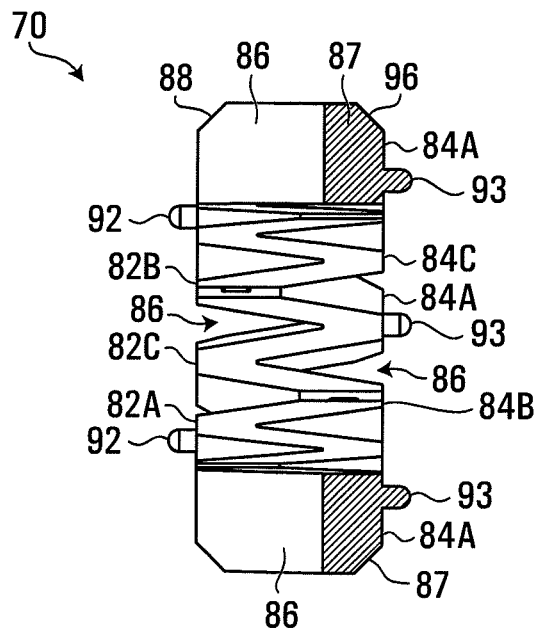
FIG. 5D is a cross-sectional view of the gripper body of FIG. 5A taken along line D-D of FIG. 5C.

FIG. 5D shows a cross-section through two opposite pins of the pins 93. The slots 86 can be seen as extending approximately ⅔ of the way through the gripper body 70 with a connecting portion 87 which maintains the continuity of the circumference of the gripper body 70.

Figure 5E:
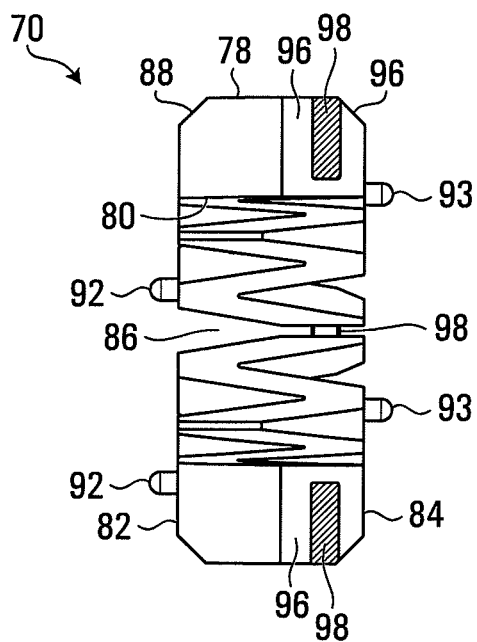
FIG. 5E is a cross-sectional view of the gripper body of FIG. 5A taken along line E-E of FIG. 5C.
Figure 5F:
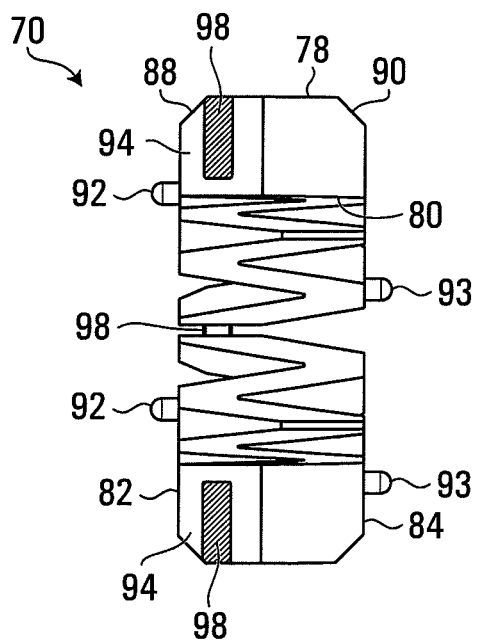
FIG. 5F is a cross-sectional view of the gripper body of FIG. 5A taken along line F-F of FIG. 5C.

The gripper body 70 also includes tooth slots 94 and 96. FIGS. 5E and 5F each show cross-sectional views through one of the tooth slots 94 and 96. The shape of the tooth slots 94 and 96 can best be seen in the cross-sectional views of FIGS. 5E and 5F. The slots 94 and 96 are shaped substantially the same as the tooth members 74 to receive the tooth members 74. The tooth slots 94 are adjacent the end face 82. The first portion of the slots 94 extends along the lands 82B. The slots then extend down along the inner surface 80 and then back into one of the cut-outs 86. The tooth slots 96 are adjacent the opposite end face 84. The first portion of the slots 96 extends along the lands 84B. The slots then extend down along the inner surface 80 and then back into one of the cut-outs 86. The result for this embodiment, as in the case of the pins 92 and 93, is four tooth slots 94 and 96 adjacent each of the end face 82 and the opposite end face 84 staggered between each other.

As can best be seen in FIGS. 5E and 5F, where the slots 94 and 96 are present, the gripper body 70 comprises a web of material 98 which maintains the continuity of the circumference of the gripper body 70. In the present embodiment, the gripper body 70 may be formed as a single piece. In other embodiments, the gripper body 70 may not have a continuous circumference and may be formed of multiple pieces. It will be appreciated that the web of material 98 is significantly smaller in cross-section than the connecting portion 87. The slots 94 and 96 and the web of material 98 together make up the cross-sectional area of the connecting portion 87. The shape, positioning and number of the slots 94 and 96 may vary depending, for example, on the number, shape and positioning of tooth members 74 that will be fitted into the slots 94 and 96. The slots 94 and 96 may also be eliminated if the tooth members 74 are eliminated.

It will be appreciated that with 12 lands on the end face 82 and the opposite end face 84 in the present embodiment, the four lands 82A and 84A each include a pin 92, 93; the four lands 82B and 84B each include a slot 96, 98 and the four lands 82C and 84C are plain. In other embodiments, there may be differing numbers of lands, pins and slots and the pins and slots may be omitted.

Figure 6A:
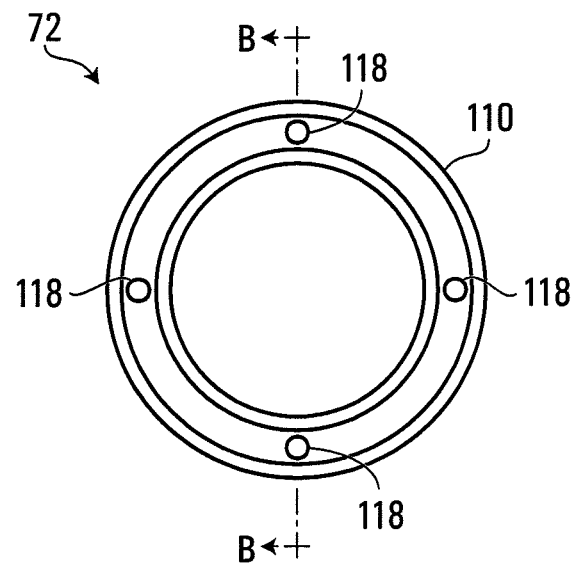
FIG. 6A is an end view of a seal of the gripping assembly of FIG. 4.
Figure 6B:
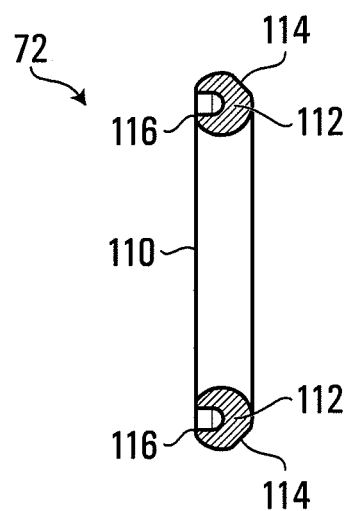
FIG. 6B is a cross-sectional view of the seal of FIG. 6A taken along line B-B of FIG. 6A.

FIGS. 6A and 6B provide further detail of the seals 72. In particular, FIGS. 6A and 6B show side and cross-sectional views of one of the seals 72. The seals 72 each have a body 110. The body 110 has a ring or annular shape. The ring of the body 110 has a cross-section 112 which is substantially circular. However, there are some variations from circular. In particular, one side of the body 110 has an angled surface 114 which extends all the way around the ring. In this embodiment, the angled surface 114 is angled at a 45° and located on the outer side of the ring.

The opposite side of the body 110 of this embodiment has a flattened surface 116 which is flattened across the face of the body 110. Four openings 118 are spaced around the flattened surface 116 and extend into the body 110 in a direction perpendicular to the flattened surface 116. The openings 118 are cylindrical with a rounded end and are sized and positioned to matingly fit with the pins 92 and 93.

It will be appreciated that the seals 72 may have other shapes depending on the shape of the gripper body 70. For example, the seals 72 may have a rectangular or irregular cross-section, they may be split rather than continuous, they may have more, fewer, differently shaped or no openings. They may have no angled and flat surfaces or differently shaped or angled surfaces. One or both of the seals 72 may be omitted.

Figure 7A:
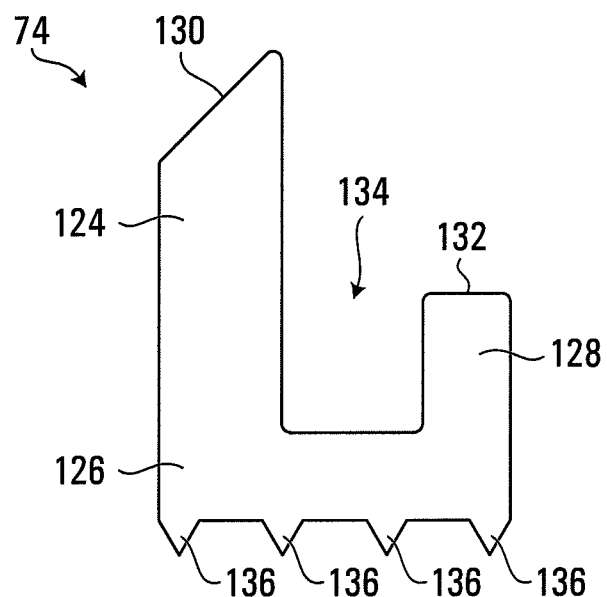
FIG. 7A is a side view of a tooth member of the gripping assembly of FIG. 4.
Figure 7B:
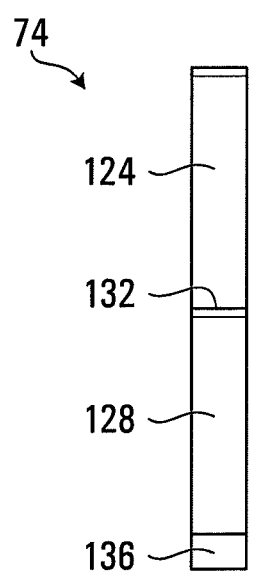
FIG. 7B is an end view of the tooth member of FIG. 7A.

FIGS. 7A and 7B provide side and end views of one of the tooth members 74. Each of the tooth members 74 are substantially J-Shaped (see FIG. 7A) with flat parallel sides (see FIG. 7B). Each tooth member 74 has a long side 124, a tooth end 126 and a short side 128. The long side 124 of this embodiment has an angled free end 130 which is angled at 45° toward the outer side. The short side 128 is substantially parallel to the long side 124 and has a squared off free end 132. The long side 124 and the short side 128 are joined by the tooth end 126 which is substantially perpendicular to both. A channel 134 is defined between the long side 124 and the short side 128.

In this embodiment, four teeth 136 are spaced apart along the outer side of the tooth end 126. The teeth 136 are triangular in this embodiment. The teeth 136 project in the opposite direction from the long side 124 and the short side 126.

The tooth members 74 are shaped to fit within the tooth slots 94 and 96 of the gripper body 70. The channels 134 are sized to accommodate the webs 98 of the gripper body 70 with the teeth 136 projecting from the inner surface 80 of the gripper body 70 and the free ends 130 flush with the angled sections 88 and 90 of the gripper body 70. It will be appreciated that other shapes of gripper body 70 may require other shapes, configurations and numbers of tooth members 74. In this embodiment, the tooth members 74 and the gripper body 70 are separate components. The tooth members 74 may also be eliminated and the gripping elements may be a gripping surface such as a roughened texture or imbedded particles provided directly on the inner surface 80 of the gripper body 70.

Figure 8:
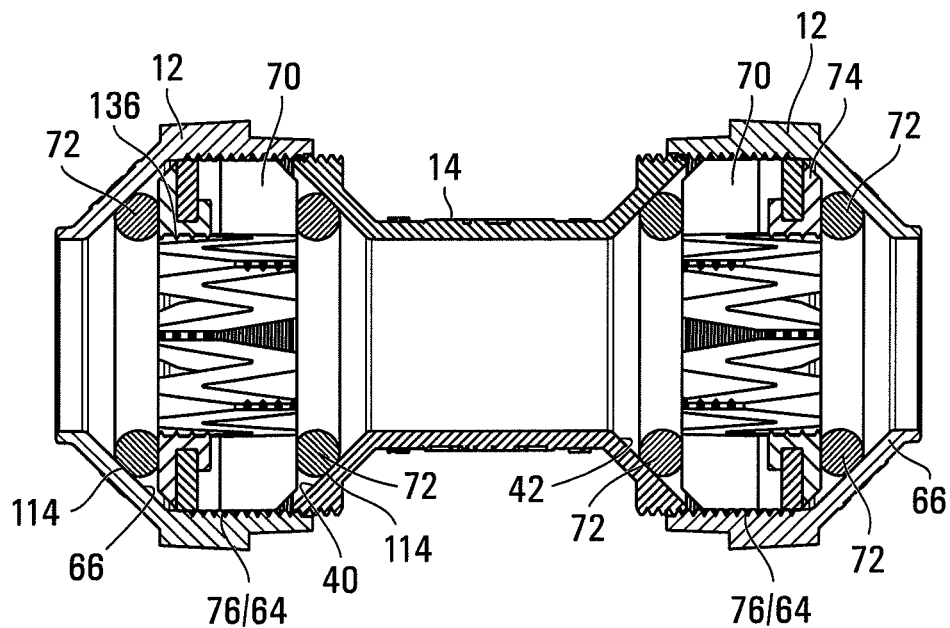
FIG. 8 is a cross-sectional view of the double ended coupling of FIG. 1A.

FIG. 8 is a cross-sectional view of the coupling 10 in an assembled state. For assembly, the tooth members 74 are slotted into the tooth slots 94 and 96 with the teeth 136 projecting inward around the inner surface 80 of the gripper body 70. The J-Shape of the tooth members 74 means that longitudinal forces do not act to dislodge the tooth members 74 from their tooth slots 94 and 96. The seals 72 are then fitted on the gripper body 70 by pushing the pins 92 into the openings 118. The thus assembled gripping assembly 16 will hold together as a unit. The gripping assembly 16 is symmetrical about its longitudinal axis such that it can be inserted into the coupling in either orientation. The gripping assembly 16 is also symmetrical about its lateral axis such that no particular orientation is needed when inserting the gripping assembly 16 into the coupling 10.

Each gripping assembly 16 fits partially within one of the nuts 12. The threaded portion 64 of each nut 12 is screwed a few turns onto the threaded portion 26 or the threaded portion 28 of the coupling body 14 as shown in FIG. 8 to hold the nut 12 and the gripping assembly 16 in place relative to the coupling body 14. FIG. 8 shows a double ended coupling 10. It will be appreciated, however that the coupling 10 may only be single ended with, for example, a straight pipe at one end.

In some embodiments, the gripper body 70 may be slightly compressed to fit within the nut 12 such that the gripping assembly 16 will not easily fall out of the nut 12 when the nut 12 is unscrewed from the coupling body 14.

In the untightened position shown in FIG. 8, the outer surface 78 of the gripper body 70 is in contact with the threaded portion 64 of the nut 12. The angled surfaces 114 of the seals 72 are in contact with the angled surfaces 66 of the nuts 12 and the angled surfaces 40 and 42 of the coupling body 14. As previously noted, the angle of all of the angled surfaces of the present embodiment is 45° such that the surfaces match around their circumference. The distance between the angled surface 66 of the nut 12 and the angled surface 42 of the coupling body 14 is longer than the length of the outer surface 78 of the gripper body 70 such that the angled surface 66 and angled surface 42 are not in contact with the angled sections 88 and 90 of the gripper body 70 in the position shown in FIG. 8.

Figure 9A:
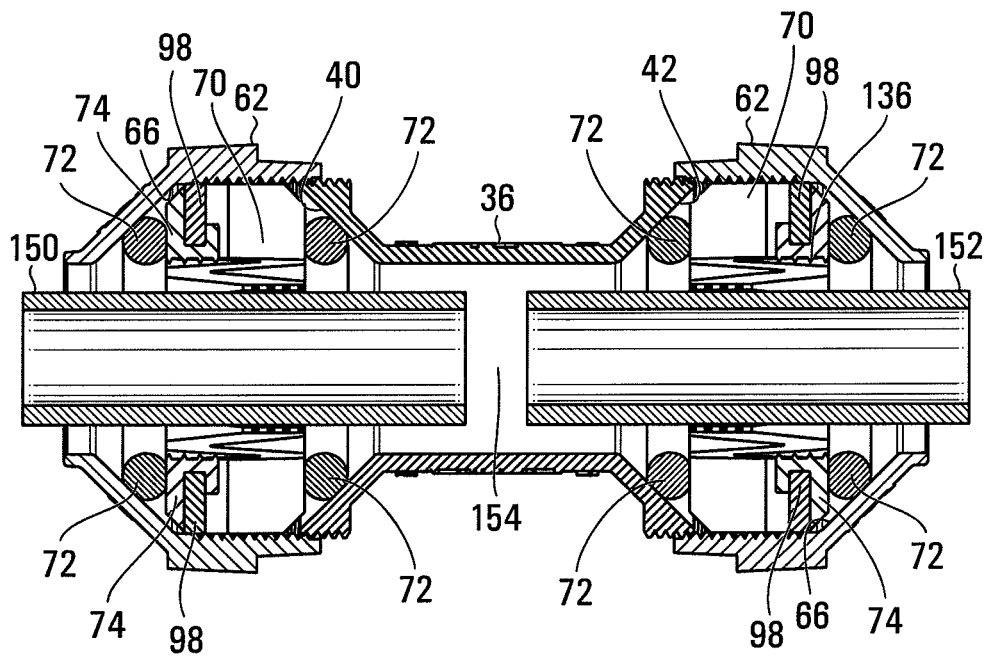
FIG. 9A is a cross-sectional view of the double ended coupling of FIG. 1A with a pipe inserted in both ends in an loosened position.
Figure 9B:
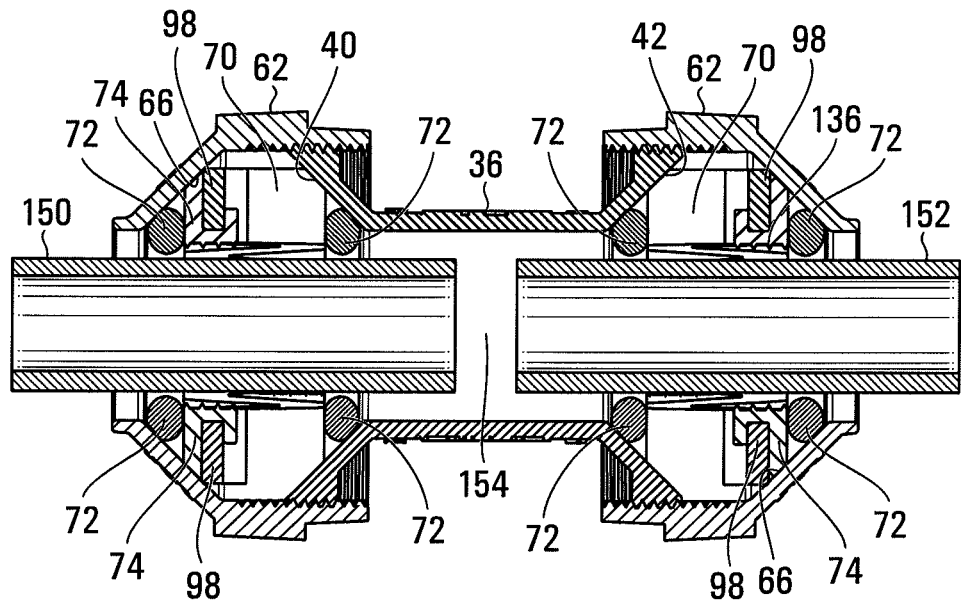
FIG. 9B is a cross-sectional view of the double ended coupling of FIG. 1A with a pipe inserted in both ends in a partly tightened position.
Figure 9C:
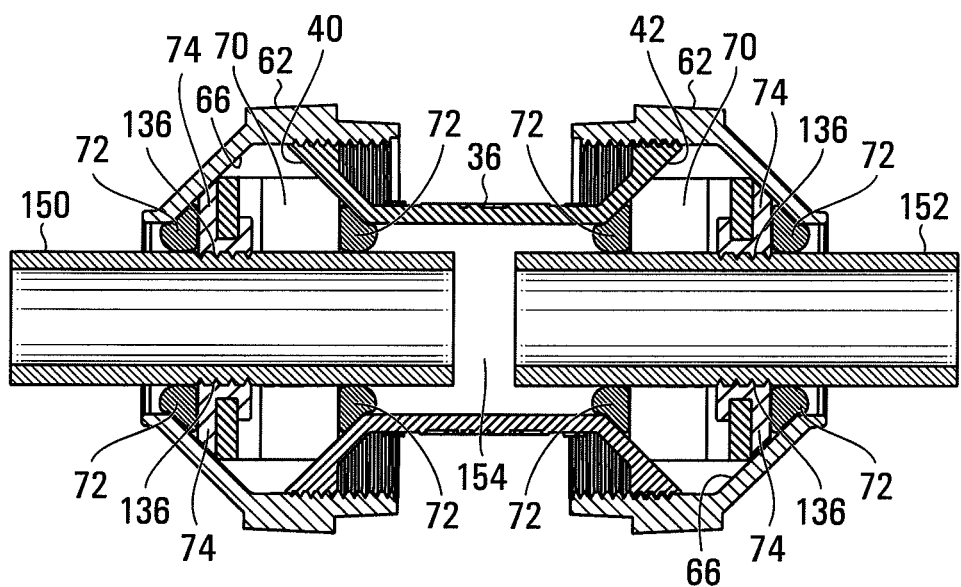
FIG. 9C is a cross-sectional view of the double ended coupling of FIG. 1A with a pipe inserted in both ends in a fully tightened position.

In FIGS. 9A to 9C, the coupling 10 is shown with pipes inserted at both ends in untightened, partially tightened and fully tightened positions. As noted above, the coupling body 14 includes pipe stop markings 38. The pipes or other members 150 and 152 may be measured and marked against the pipe stop markings 38 before being inserted into the coupling 10. The pipes 150 and 152 are inserted up to their respective markings so that a spacing 154 is maintained between inner ends of the pipes 150 and 152.

Once the pipes 150 and 152 are in the correct longitudinal positions, the nuts 12 can be tightened onto the coupling body 14. This can be done by using wrenches to hold the coupling body 14 by the flats 36 and gripping and turning the nuts 12 by the flats 62. As the nuts 12 are threaded onto the coupling body 14, the distance between the angled surface 66 of the nut 12 and the angled surface 42 of the coupling body 14 decreases to less than the length of the outer surface 78 of the gripper body 70 such that the angled surface 66 and angled surface 42 come into contact with the angled sections 88 and 90 of the gripper body 70. As the nut is further tightened and moved longitudinally relative to the coupler body 14, the gripper body 70 is subject to an inward radial force and is compressed inward by the sliding of the angled sections 88 and 90 of the gripper body 70 along the angled surfaces 42 and 66. It will be appreciated that the longitudinal component of the force on each end will balance so that the net force is radially inward. The seals 72 are also compressed inward both because they are connected to the gripper body 70 by the pins 92 and the corresponding openings 118 and because the seals are wedged between the gripper body 70, the angled surfaces 42 and 66 and the pipes 150 and 155.

Figure 10:
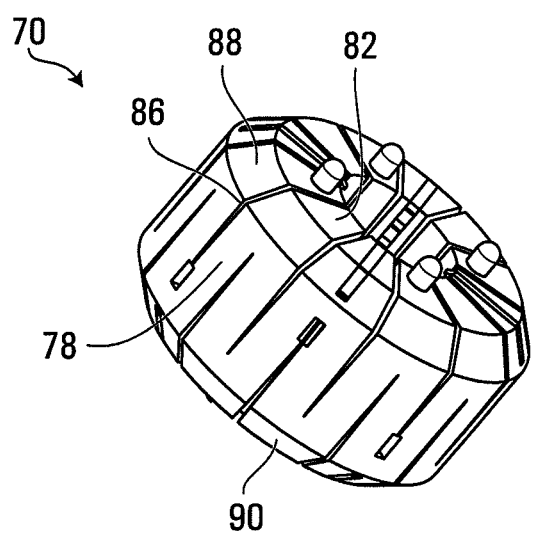
FIG. 10 is a perspective view of the gripping assembly of FIG. 4 in a fully tightened position.

As the gripper body 70 is compressed, the openings formed by the cut-outs 86 are gradually deformed and closed to the compressed position shown in FIG. 10 in which the angle between the sides of the cut-outs 86 is decreased and the cut-outs 86 are almost completely closed. It will be appreciated that the gripper body 70 in the compressed configuration shown in FIG. 10 has almost completely solid end faces 82 and 84 for supporting the seals 72.

As the nut 12 is further tightened, the gripper body 70 is further compressed and the teeth 136 move inward until the teeth 136 grip the pipes 150 and 152. Once the teeth 136 grip the pipe 150 with sufficient force, the nut 12 can not be further tightened. With some pipe materials, such as galvanized steel, the teeth 136 may penetrate the pipe to only a small degree. For other pipe materials, the teeth 136 may penetrate the pipe material for substantially the entire length of the teeth 136. In some embodiments, the gripper may bottom out with the spaces between the teeth 136 resting against the pipe.

The pipes 150 and 152 are substantially the smallest diameter pipes which can be gripped by the coupling 10. In the position shown in FIG. 9C, the nut 12 has almost reached the end of the threads of the threaded portion 64 on the threaded portions 26 and 28. It will be appreciated that pipes of significantly larger diameter may also be clamped by the coupling 10. When a larger diameter pipe is inserted into one of the ends of the coupling 10, the distance that the nut 12 needs to be threaded onto the coupling body 14, and the consequent compression on the gripping assembly 16 required to bring the teeth 136 into contact with the pipe to hold the pipe, will be less. The coupling 10 may accommodate pipes of a wide range of diameters, for example, from 18.6 mm to 28.8 mm (0.73 in to 1.14 in) or from 25.4 mm to 35.6 mm (1.00 in to 1.40 in). In some embodiments, pipes up to a 7.62 mm (3.00 in) nominal diameter may be coupled.

In the fully tightened position in FIG. 9C, the seals 72 adjacent the inner ends of the pipes 150 and 152 prevent leakage into and out of the pipes 150 and 152. The seals 72 adjacent the outer ends of the pipes 150 and 152 prevent leakage into the coupling 10 and may be omitted without compromising the seal to the pipes 150 and 152 provided by the coupling 10.

In this embodiment, the teeth 136 grip, and may penetrate the surface of the pipes 150 and 152. However, the teeth 136 do not puncture the pipes 150 and 152. In particular, the length of the teeth 136 is less than the thickness of the pipes 150 and 152 so that the teeth will bottom out against the pipes 150 and 152 before they can penetrate the pipes 150 and 152.

As noted above, the coupling of the present embodiment may be used to couple together pipes of different diameter or to couple a pipe to an assembly that incorporates a single end of the coupling.

The coupling 10 can be formed of a variety of different materials. The coupling nut 12, the coupling body 14 and the tooth members 74 may all be made of conductive materials such as a metal. When the coupling is in the tightened position shown in FIG. 9C, there is a conductive path provided from the pipe 150, through the tooth members 74, through the first nut 12, through the coupling body 14, through the second nut 12, through the tooth members 74 and to the pipe 152. This electrical or conductive path may aid in preventing erosion of the coupling 10. In particular, without an electrically conductive path, the fluid in the pipes (e.g. water) may act as a conductor and stray current may erode the coupling 10.

Figure 11A:
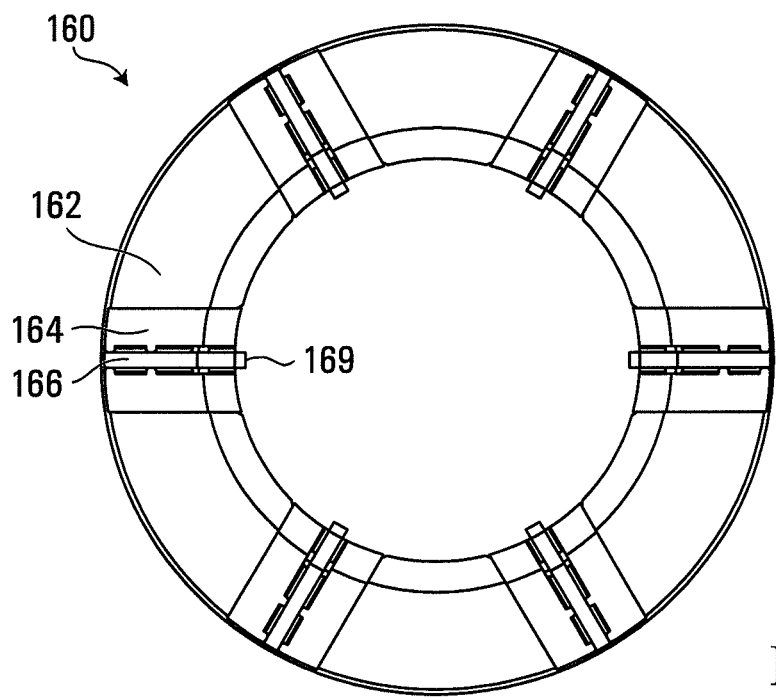
FIG. 11A is an end view of a second embodiment of a gripping assembly according to a second embodiment of the invention.
Figure 11B:
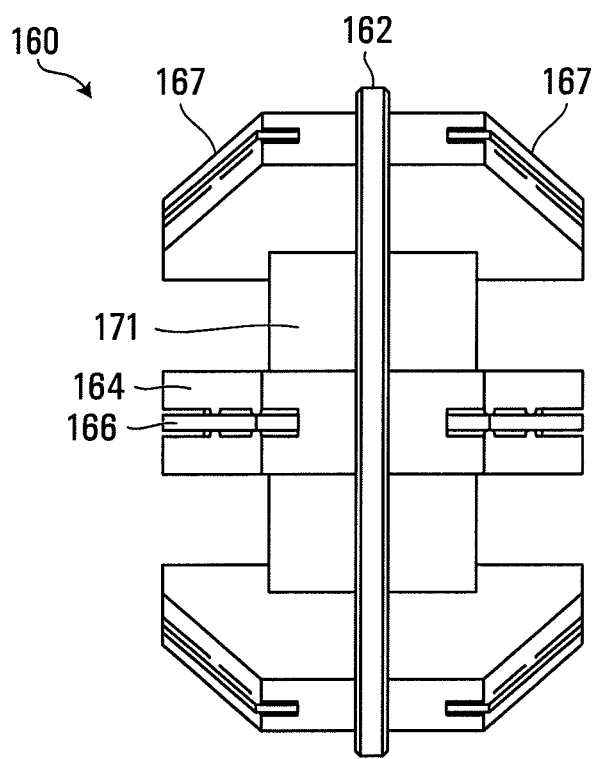
FIG. 11B is a side view of the gripping assembly of FIG. 11A.

FIGS. 11A to 11B depict another gripping assembly 160 which may be used in place of the gripping assembly 16 described above. The gripping assembly 160 comprises a body 162 which holds sliding blocks 168. The sliding blocks 168 are engaged with the body 162 to slide inward while being held by the body 162. The sliding blocks 168 incorporate tooth members 166. The tooth members 166 have inwardly facing teeth 169. The sliding blocks 164 have 45° angled sections 167 which are acted upon by the decreasing diameter sections 40, 42 and 66 to move the sliding blocks, and therefore, teeth 169, inward in the body 162. The sliding blocks 164 and the tooth members 166 together form the gripping elements of this embodiment.

Figure 12A:
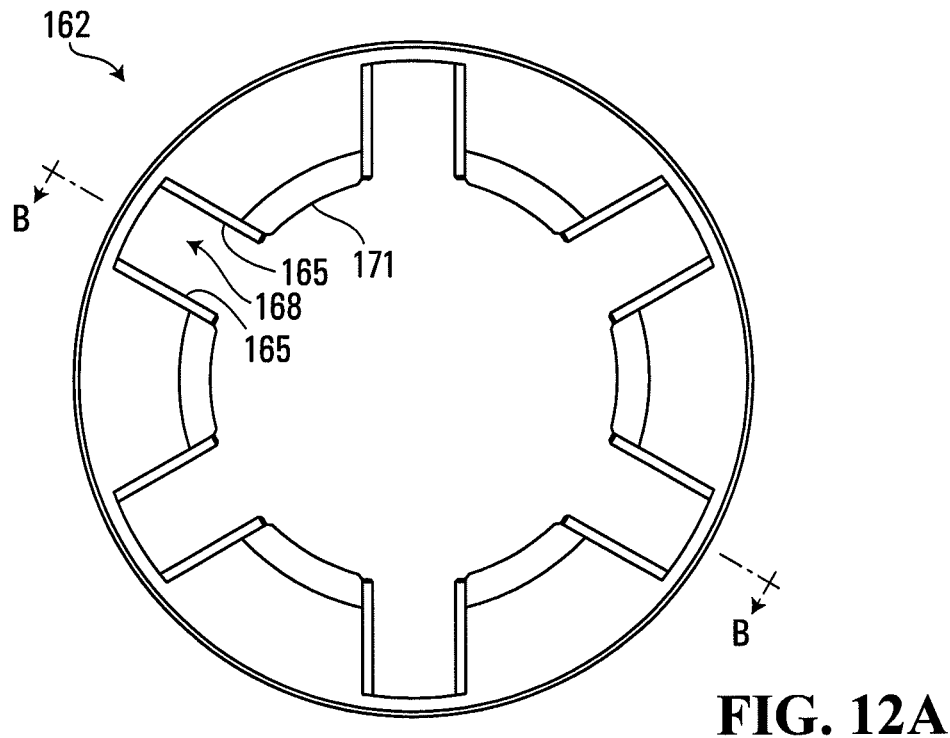
FIG. 12A is an end view of a gripper body of the embodiment of FIG. 11A.
Figure 12B:
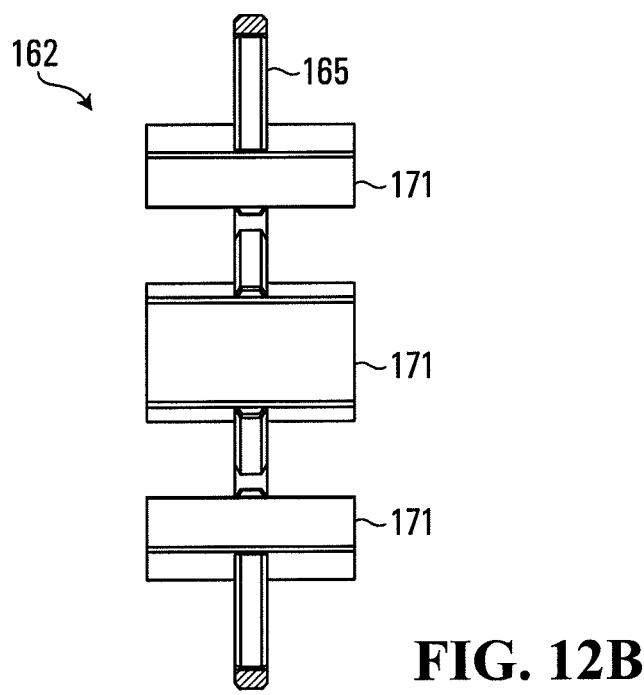
FIG. 12B is a cross-sectional view of the gripper body of FIG. 12A taken along line B-B of FIG. 12A.

FIGS. 12A and 12B show the body 162 of the gripping assembly 160. The body 162 is ring shaped with six slots 163 defined around the ring for receiving the sliding blocks 164. Chamfered edges 165 are defined along the sides of the slots 163 to facilitate sliding of the sliding blocks 164. Walls 171 are defined between the slots 163 of this embodiment to help to guide the sliding blocks 164.

Figure 13A:
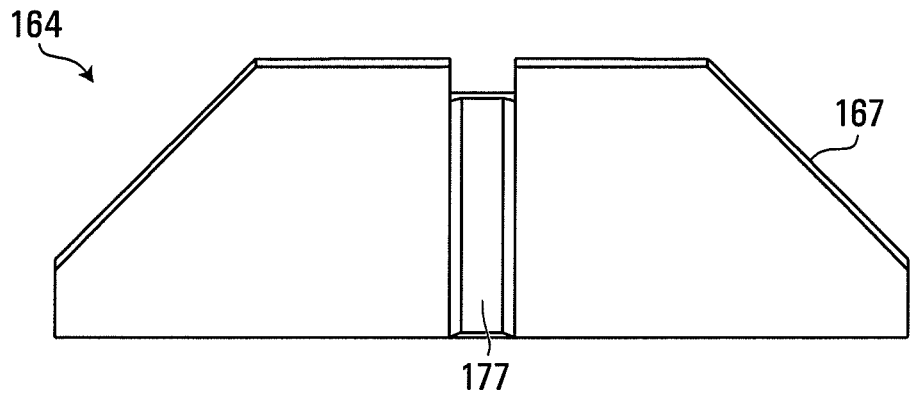
FIG. 13A is a side view of a sliding block of the embodiment of FIG. 11A.
Figure 13B:
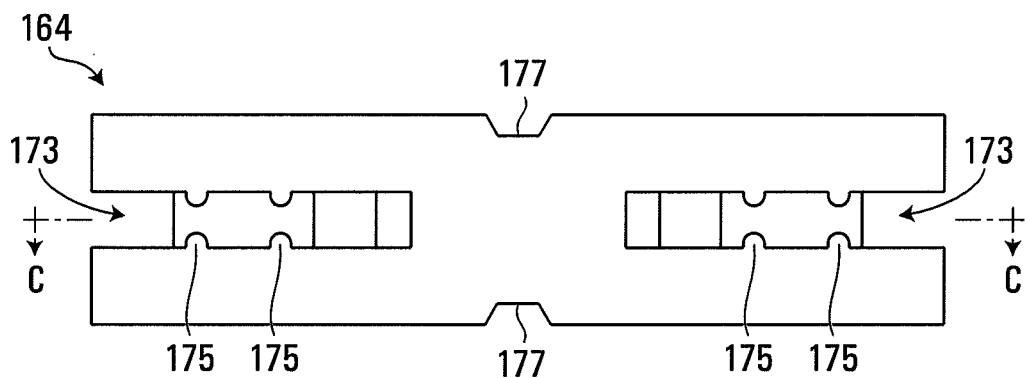
FIG. 13B is an end view of a sliding block of FIG. 13A.
Figure 13C:
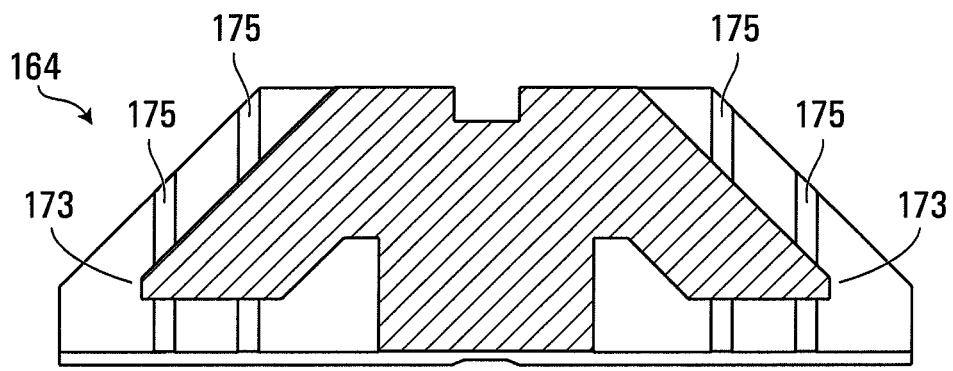
FIG. 13C is a cross-sectional view of the sliding block of FIG. 13A taken along line C-C of FIG. 13B.

FIGS. 13A, 13B and 13C show one of the sliding blocks 164. The sliding blocks 164, as noted above, have angled sections 167. The sliding blocks also have cut-outs 173 for receiving the tooth members 166. The cut-outs 173 include protrusions 175 for engaging and retaining the tooth members 166. The sliding blocks also define recesses 177 which are shaped to complement the chamfered edges 165 of the body 162 to enable inward and outward sliding of the sliding blocks 164.

Figure 14:
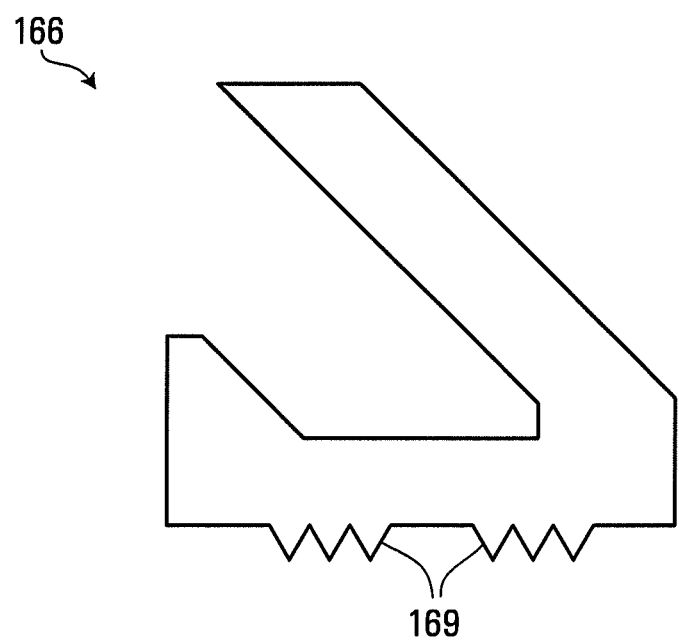
FIG. 14 is a side view of a tooth member of the embodiment of FIG. 11A.

FIG. 14 depicts one of the tooth members 166. The tooth members 166 are shaped to slide into the cut-outs 173 with the teeth 169 facing inward. The tooth members 166 are held in the sliding members 164 by the protrusions 175. The sliding blocks are slid into the slots 163 with the recesses 163 sliding along the chamfered edges 165.

Figure 15A:
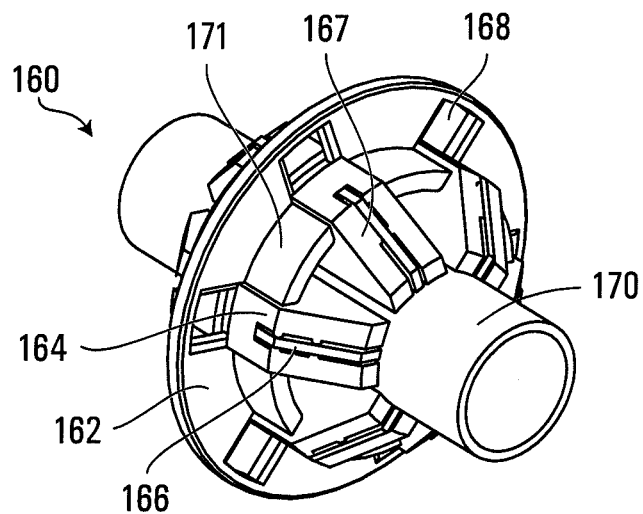
FIG. 15A is a perspective view of the gripping assembly of FIG. 11A tightened on a small diameter pipe.
Figure 15B:
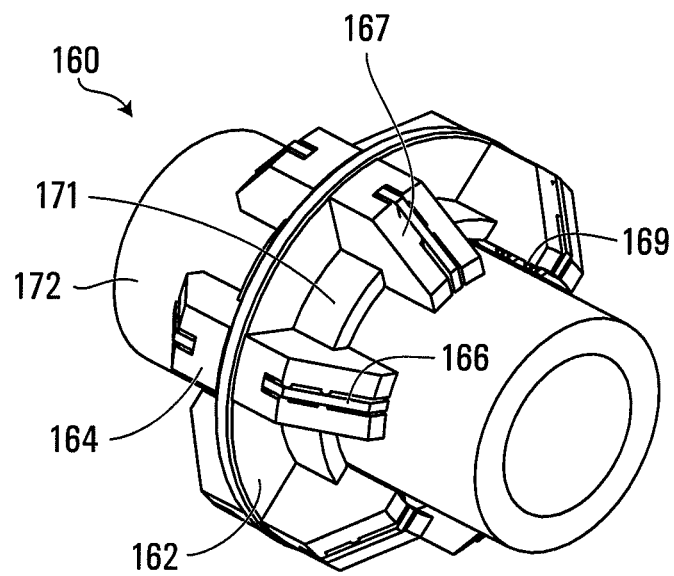
FIG. 15B is a perspective view of the gripping assembly of FIG. 11A tightened on a large diameter pipe.

FIGS. 15A and 15B show the gripping assembly 160 in two positions with the remainder of the coupling omitted. In the position shown in FIG. 15A, the sliding blocks 164 have been slid inward such that teeth 169 grip a pipe 170 leaving openings 168 where the sliding blocks 164 have been moved. In the position shown in FIG. 15B, the sliding blocks 164 and teeth 169 are gripping a larger pipe and have therefore been slid inward a lesser distance.

The present embodiment depicts six sliding blocks 164. In other embodiments, there may be different numbers and shapes of sliding blocks 164, tooth members 166, and teeth 169. The shape of the body 162 may also differ depending on the shape of the sliding blocks.

In the depicted embodiments, the teeth move inward by either compression of the gripper body or by sliding of a portion of the gripper body. In other embodiments, other mechanisms may be used such as material compression.

In the depicted embodiments, the gripper assembly is symmetrical. In other embodiments, the gripper assembly may not be symmetrical and the cooperating angled surfaces may be only on one end with the other end, for example, being flat.

What has been described is merely illustrative of the application of the principles of the invention. Other arrangements and methods can be implemented by those skilled in the art without departing from the spirit and scope of the present invention.

The invention claimed is:

1. A gripping device for use in gripping an inserted member, comprising:
    a body, wherein the body defines a passage extending therethrough between opposite longitudinal ends of the body, the body having an outer surface and an inner surface, and
    gripping elements received within recesses defined within the body spaced apart around the inner surface of the body, each gripping element having a gripping surface protruding inward from the inner surface, each gripping element extending longitudinally along the passage between a proximal end and a distal end of the gripping element, the proximal end and the distal end being movable inward at a constant rate to uniformly grip an outer surface of the inserted member along a longitudinal length of each gripping surface;
    wherein each of the gripping elements are radially movable upon application of a radial inward force to the outer surface of the body wherein a spacing between adjacent gripping elements is uniformly reduced between the proximal end and the distal end of each gripping element; and
    wherein the body comprises a plurality of openings between the gripping elements and the spacing between the gripping elements is reducible upon deformation of the openings.

2. The device of claim 1 wherein the gripping device is adapted to receive an inserted member that is one of a conduit, a pipe, a cylindrical member and a control mechanism.

3. The device of claim 1 wherein the body has a continuous circumference.

4. The device of claim 1 wherein the body comprises a plurality of elements extending substantially longitudinally between opposite longitudinal ends, wherein the elements are alternately attached at opposing longitudinal ends to form a zigzag shape.

5. The device of claim 1 wherein the gripping elements are alternatively positioned adjacent the opposite longitudinal ends of the body.

6. The device of claim 1 wherein the openings extend longitudinally from at least one of the longitudinal ends.

7. The device of claim 6 wherein the openings extend alternatively from the longitudinal ends.

8. The device of claim 7 wherein the openings are V-shaped and adapted to decrease the spacing between the sides of the openings upon application of the radial inward force.

9. The device of claim 8 wherein there is at least one opening between each of the gripping elements.

10. The device of claim 7 wherein the longitudinal ends comprise ends surfaces which are substantially continuous when the openings are substantially closed.

11. The device of claim 1 wherein the gripping elements are supported against longitudinal movement.

12. The device of claim 11 wherein the gripping elements are slidable relative to the body.

13. The device of claim 12 wherein the gripping elements comprise a slidable block element and a tooth element retained in the block element.

14. The device of claim 1 wherein the outer surface of the body comprises at least one angled outer surface and the gripping elements are adapted to move inward, into the passage, upon application of the radial force to the angled outer surface.

15. The device of claim 1 wherein the gripping elements comprise tooth elements which are moveable by compression of the body.

16. The device of claim 1 wherein at least one of the longitudinal ends of the body defines at least one longitudinally extending protrusion for mating with at least one corresponding recess in a seal.

17. The device of claim 16 further comprising at least one seal defining at least one recess configured to receive a respective at least one longitudinally extending protrusion.

18. The device of claim 1 wherein the body is uniformly radially compressible between the longitudinal ends.

19. The device of claim 1 wherein the device is symmetrical about a longitudinal axis.

20. A coupling comprising:
a coupling body having longitudinal ends, a passage defined through the body between longitudinal ends, and a longitudinal adjustment mechanism at a first of the longitudinal ends;
a movable member having a co-operable longitudinal adjustment mechanism;
at least one of the coupling body and the movable member having an angled inner surface angling inwardly away from the other of the coupling body and the movable member;
a gripping member comprising:
a gripping member body defining a passage extending through the gripping member, the gripping member body having an outer surface and an inner surface and longitudinal ends, at least a portion of the outer surface of the gripping member being an angled outer surface to co-operate with the angled inner surface of the coupling body or the movable member; and
gripping elements spaced apart around the inner surface, each gripping element having a gripping surface protruding inward from the inner surface, each gripping element extending longitudinally along the passage between a proximal end and a distal end of the gripping element, the proximal end and the distal end being movable inward at a constant rate to uniformly grip an outer surface of the inserted member along a longitudinal length of each gripping element;
wherein the gripping member is sized to fit within a space defined by the coupling body and the movable member; and
wherein, upon tightening of the moveable member, the angled inner surface abuts against and exerts a force on the angled outer surface of the gripping member in a radial inward direction to cause the gripping member to be urged radially against the inserted member uniformly along the longitudinal length of the gripping elements when the inserted member is inserted into the coupling, wherein the gripping member restricts movement of the inserted member.

21. The coupling of claim 20 wherein both the movable member and the body comprise an angled inner surface, and wherein the outer surface of the gripping member comprises two angled surfaces complementary to the angled inner surfaces of the movable member and the coupling body, wherein upon tightening, the angled inner surfaces abut against and exert a symmetrical force on the angled outer surfaces of the gripping member in a radial direction to be symmetrically urged radially against the inserted member.

22. The coupling of claim 20 further comprising at least one annular seal sized to fit within the space, the at least one annular seal comprising at least one longitudinally extending recess, wherein at least one of the longitudinal ends of the gripping member body comprise at least one longitudinally extending corresponding protrusion shaped to mate with a corresponding one of the at least one recess of the at least one annular seal wherein the at least one annular seal is movable with the coupling body to create a seal against the inserted member upon tightening.

23. The coupling of claim 20 wherein the coupling body comprises external threads at a first of the longitudinal ends and the movable member comprises a nut having internal threads co-operable with the coupling body external threads wherein the movable member is movable longitudinally screwing the threads.

24. The coupling of claim 20 wherein the coupling body, the movable member and the gripping elements comprise a conductive material and provide a conductive pathway from the inserted member to the coupling body.

25. The coupling of claim 20 wherein the gripping member body is uniformly radially compressible between the longitudinal ends.

26. The coupling of claim 20 wherein the gripping member is symmetrical about a longitudinal axis.

* * * * *